No. 12,676. REISSUED JULY 23, 1907.

D. H. RYAN.

BASKET CONSTRUCTION.

APPLICATION FILED AUG. 11, 1906.

Witnesses:

D. M. Kennaly.

Louis Shuman.

Inventor,

David H. Ryan.

By Meyers, Cushman & Rea

Attorneys.

THE NORRIS PETERS CO., WASHINGTON, D. C.

UNITED STATES PATENT OFFICE.

DAVID HENDERSON RYAN, OF CONCORD DEPOT, VIRGINIA.

BASKET CONSTRUCTION.

No. 12,676. Specification of Reissued Letters Patent. Reissued July 23, 1907.

Original No. 799,405, dated September 12, 1905, Serial No. 232,844. Application for reissue filed August 11, 1906. Serial No. 330,273.

*To all whom it may concern:*

Be it known that I, DAVID HENDERSON RYAN, a citizen of the United States, residing at Concord Depot, county of Campbell, and State of Virginia, have invented new and useful Improvements in Basket Construction, of which the following is a specification.

My invention relates to basket construction, and more particularly to a reinforcement for baskets whereby the finished article will be useful in carrying heavy loads, as loads of tobacco and various other commodities, without liability to causing undue strain and serious damage.

A further object of my invention is to provide a basket which will possess great durability and wear-resisting capacity and wherein the framework and side walls and bottom sections will be reliably sustained in their several positions.

Other objects and advantages will be hereinafter made clearly apparent, reference being had to the accompanying drawings, which are made a part of this application, and in which—

Figure 1:
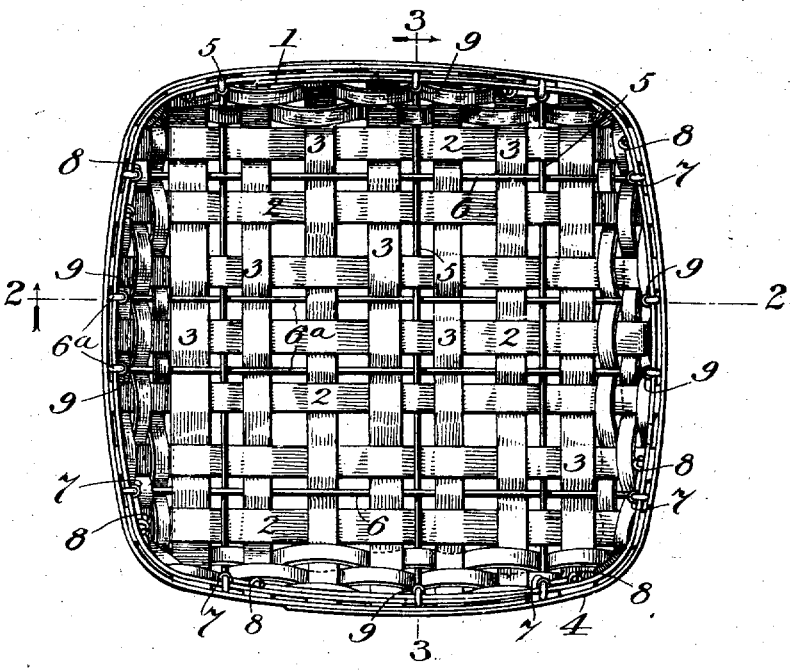
Figure 2:
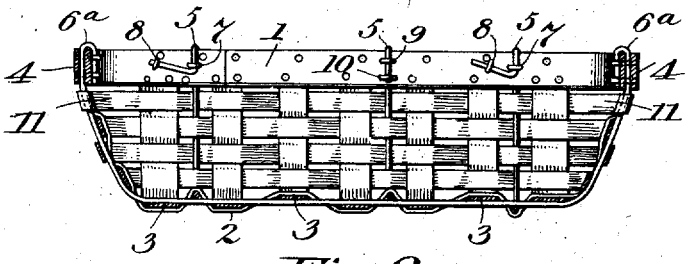
Figure 3:
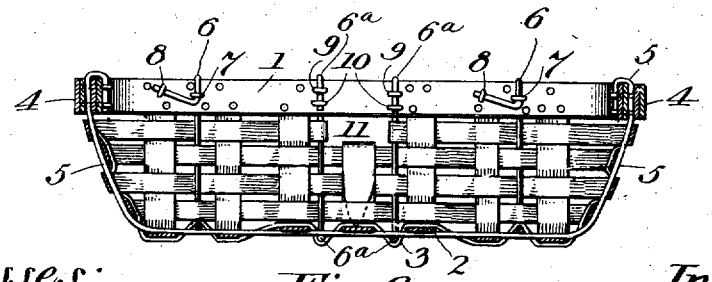

Figure 1 shows a top plan view of my basket complete ready for use. Fig. 2 shows a sectional view of Fig. 1, taken on line 2 2. Fig. 3 shows a sectional view taken at right angles to the construction shown in Fig. 2 or as indicated by dotted line 3 3 of Fig. 1.

For convenience of description the various parts of my invention and coöperating accessories will be designated by numerals, the same numeral applying to a similar part throughout the several views.

Referring to the numerals on the drawings, 1 designates the rim commonly employed in forming the upper edge of the basket and designed as a starting and ending point for the splints 2 and 3, said splints 2 and 3 being interwoven with each other, as is common, while their ends are firmly secured between the inner member or strip 1 and the outer member or strip 4, serving as the top of the basket.

In order to provide suitable reinforcement for the splints 2 and 3, commonly made of wood of suitable variety, I provide the wires 5, 6, and $6^a$, also interlaced with each other and with the said splints 2 and 3, whereby the said wires or rods 5, 6, and $6^a$ will serve at proper intervals as a reliable reinforcement for the splints 2 and 3. The wires or rods 5 and 6 being interlaced with the splints and with each other, have their ends extended upward between the members or bars 1 and 4 and then bent downward on the inner face of the member 1 and pass through a securing-staple 7 and thence bent and extended substantially parallel with the member 1, where the free end of the wire is secured under the staple 8 or equivalent device, or the ends of the wires may be secured by the staples 9, and 10, arranged one above the other as shown in the drawings.

The wires $6^a$ are in like manner interlaced with the splints and with the wires 5, and have their extremities extended up between the members 1 and 4, and the free ends thereof are then bent downward against the inner side of the member 1 and secured in the manner described or by the staples 9 and 10. It will thus be seen that it will be practically impossible for the free ends of the wires to become casually loosened and that the strain or load placed in the basket will be received by the interwoven reinforcing-wires 5, 6, and $6^a$, and since the basket is commonly lifted by the rim-section it is obvious that since the wires are connected to said rim the load will be cared for in a safe and reliable manner.

For convenience of handling an opening 11 is left on opposite sides of the basket immediately below the members 1 and 4, whereby the operator may grasp said members 1 and 4, and it is owing to this use made of the basket that I place the two reinforcing-wires $6^a$ closely together or one upon each side of the opening 11.

It will be seen that I have provided a reliable efficient form of basket, which, owing to its peculiar construction will possess great strain and wear resisting qualities, and believing that the advantages, construction, and manner of using my basket have thus been made clearly apparent further description is deemed unnecessary.

Having thus fully described my invention, what I claim as new, and desire to secure by Letters Patent, is—

1. The combination with a basket comprising a body of wood fabric and a rim upon the edge of the body formed of the parallel members permanently connected; of reinforcing means comprising series of metallic strands arranged at right angles within the bottom of the basket-body and interwoven to form a metallic fabric, said strands being also interwoven with the fabric constituting the bottom of the basket-body, and the ends of the strands being interwoven in the sides of the basket-body, said strands projecting between the members of the rim-section and having angular extensions, and means for securing the extensions to the rim-section, the basket-body having apertures therein reinforced along opposite edges by two of the strands.

2. A basket comprising a body of plaited or interwoven wood splints 2, and 3, arranged at right angles to each other respectively in spaced parallel relation, and a rim upon the edge of the body formed of the parallel members 1 and 4, permanently connected to the said wood splints, and reinforcing means comprising the two series of wire strands 5 and 6 arranged at right angles to each other in the spaces between some of the wood splints and interwoven therewith and with each other in the bottom of the basket,— the strands extending up the sides of the basket and having their extremities secured to the rim.

3. A basket comprising a body of plaited or interwoven wood splints 2, and 3, arranged at right angles to each other and respectively in spaced parallel relation, and a rim upon the edge of the body formed of the parallel members 1 and 4, permanently connected to the said wood splints, and reinforcing means comprising series of wire strands arranged in the spaces between some of the wood splints and interwoven therewith and with each other in the bottom of the basket, the end portions of the strands extending up the sides of the basket and having their extremities projecting between the members of the rim section, and means for securing them to said rim.

In testimony whereof I have hereunto affixed my name the 7th day of August, 1906.

DAVID HENDERSON RYAN.

Witnesses:

JNO. MOTEY,

JAMES A. SCOTT.